(12) United States Patent
Bhamidipati et al.

(10) Patent No.: US 11,057,501 B2
(45) Date of Patent: Jul. 6, 2021

(54) INCREASING THROUGHPUT DENSITY OF TCP TRAFFIC ON A HYBRID DATA NETWORK HAVING BOTH WIRED AND WIRELESS CONNECTIONS BY MODIFYING TCP LAYER BEHAVIOR OVER THE WIRELESS CONNECTION WHILE MAINTAINING TCP PROTOCOL

(71) Applicant: Fortinet, Inc., Sunnyvale, CA (US)

(72) Inventors: Subrahmanyam Bhamidipati, Hyderabad (IN); Siva Rama Krishna Rao Yogendra Jupudi, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 129 days.

(21) Appl. No.: 16/237,636

(22) Filed: Dec. 31, 2018

(65) Prior Publication Data

US 2020/0213424 A1   Jul. 2, 2020

(51) Int. Cl.
*H04L 29/06* (2006.01)
*H04L 29/08* (2006.01)
*H04L 12/24* (2006.01)
*H04W 64/00* (2009.01)
*H04L 12/16* (2006.01)
*H04W 84/12* (2009.01)
*H04W 74/08* (2009.01)
*H04W 88/08* (2009.01)
*H04L 12/26* (2006.01)

(52) U.S. Cl.
CPC ......... *H04L 69/161* (2013.01); *H04L 41/069* (2013.01); *H04L 67/28* (2013.01); *H04W 64/006* (2013.01); *H04L 43/028* (2013.01); *H04L 67/20* (2013.01); *H04W 74/0816* (2013.01); *H04W 84/12* (2013.01); *H04W 88/08* (2013.01)

(58) Field of Classification Search
CPC ..... H04L 69/161; H04L 41/069; H04L 67/20; H04L 67/28; H04L 43/028; H04L 69/162; H04L 41/06; H04L 43/00; H04W 64/006; H04W 74/0816; H04W 84/12; H04W 88/08
See application file for complete search history.

(56) References Cited

U.S. PATENT DOCUMENTS

| | | | |
|---|---|---|---|
| 2002/0078164 A1* | 6/2002 | Reinschmidt | H04L 1/0001 709/217 |
| 2003/0140140 A1* | 7/2003 | Lahtinen | H04L 63/1441 709/224 |

(Continued)

*Primary Examiner* — Jenee Holland
(74) *Attorney, Agent, or Firm* — Law Office of Dorian Cartwright; Dorian Cartwright (57) ABSTRACT

A WLAN driver of the TCP proxy device transmits network packets transmitted from a sender device over the data communication network to a wireless station. TCP network packets are diverted to a TCP proxy pipeline. First, the wireless receiver device is emulated to a wireless sender device by providing an ACK packet to the sender device in order to close the TCP session on the sender side by responding to a TCP handshake with the sender device. Second, the sender device is emulated to a wireless station over the wireless network connection by initiating a TCP handshake with a wireless station including receiving an ACK packet from the wireless station and suppressing the ACK packet from an initial destination associated with the sender device.

4 Claims, 5 Drawing Sheets

(56) References Cited

U.S. PATENT DOCUMENTS

| | | | |
|---|---|---|---|
| 2005/0055399 A1* | 3/2005 | Savchuk | H04L 63/1416 709/203 |
| 2006/0190612 A1* | 8/2006 | Kahol | H04L 69/16 709/230 |
| 2007/0223379 A1* | 9/2007 | Sivakumar | H04L 47/27 370/235 |
| 2008/0107124 A1* | 5/2008 | Ros-Giralt | H04L 69/16 370/401 |
| 2010/0077063 A1* | 3/2010 | Amit | H04L 12/12 709/221 |
| 2010/0121957 A1* | 5/2010 | Roy | H04L 63/1466 709/227 |
| 2010/0332212 A1* | 12/2010 | Finkelman | H04L 12/12 703/23 |
| 2011/0320589 A1* | 12/2011 | Hietala | H04L 63/0245 709/224 |
| 2012/0011271 A1* | 1/2012 | Zhao | H04L 67/2847 709/234 |
| 2012/0039332 A1* | 2/2012 | Jackowski | H04L 47/2441 370/389 |
| 2013/0010775 A1* | 1/2013 | Kish | H04L 69/16 370/338 |
| 2013/0114408 A1* | 5/2013 | Sastry | H04L 47/27 370/231 |
| 2013/0238759 A1* | 9/2013 | Ostrowski | H04L 61/6013 709/219 |
| 2014/0036674 A1* | 2/2014 | Agrawal | H04L 69/163 370/235 |
| 2014/0189145 A1* | 7/2014 | Frydman | H04L 69/22 709/231 |
| 2017/0099196 A1* | 4/2017 | Barsheshet | H04L 49/70 |

* cited by examiner

INCREASING THROUGHPUT DENSITY OF TCP TRAFFIC ON A HYBRID DATA NETWORK HAVING BOTH WIRED AND WIRELESS CONNECTIONS BY MODIFYING TCP LAYER BEHAVIOR OVER THE WIRELESS CONNECTION WHILE MAINTAINING TCP PROTOCOL

FIELD OF THE INVENTION

The invention relates generally to computer networking improvements, and more specifically, to increasing throughput density of TCP traffic on a hybrid network having both wired and wireless connections, by modifying TCP layer behavior over the wireless connection while maintaining TCP protocol.

BACKGROUND

TCP, or transmission control protocol, is a standard that defines how to establish and maintain a network conversation for exchanging data. TCP works within the Internet Protocol (IP) which defines how computers send packets of data to each other. Specific to Wi-Fi networks, TCP throughput can be lowered due congestion from wireless networks at access points. In turn, network performance is degraded when a datapath traverses a hybrid network that includes a wireless portion.

Effective TCP session is governed by congestion window, tcp-ack delays and lower retransmissions. TCP is designed for operation in wired networks where random packet losses due to transmission errors are negligible. TCP does not adapt appropriately to losses on wireless links, as it interprets the cause as being network congestion.

Wireless networks can have packet errors due to inherent collision avoidance approach before packet transmission, due to RF signal loss/collisions, due to channel interference. With wireless network as intermediate hop between two wired end points, wireless packet loss worsens the retransmission time which adversely impacts the congestion window size and thus effective TCP session data exchange gets slow.

Therefore, what is needed is a robust system to increase throughput density of TCP traffic on a hybrid network having both wired and wireless connections, by modifying TCP layer behavior over the wireless connection while maintaining TCP protocol. Additional optimizations such as network packet aggregation can be leveraged from forced flexibility in TCP standards.

SUMMARY

These shortcomings are addressed by the present disclosure of methods, computer program products, and systems for increasing throughput density of TCP traffic on a hybrid network having both wired and wireless connections, by modifying TCP layer behavior over the wireless connection while maintaining TCP protocol.

In one embodiment, a WLAN driver of the TCP proxy device transmits network packets transmitted from a sender device over the data communication network to a wireless station. The network packets are examined, for example with DPI (deep packet inspection), to detect a TCP session. In response, the network packets are diverted to a TCP proxy pipeline.

In another embodiment, the wireless receiver device is emulated to a wireless sender device by providing an ACK packet to the sender device in order to close the TCP session on the sender side by responding to a TCP handshake with the sender device. Further, the sender device is emulated to a wireless station over the wireless network connection by initiating a TCP handshake with a wireless station including receiving an ACK packet from the wireless station and suppressing the ACK packet from an initial destination associated with the sender device. The WLAN driver then transmits the network packets for transmission to the wireless station over the wireless network of the data communication network.

In still another embodiment, wireless packets are aggregated while in between TCP protocol enforcement. One implementation buffers a maximum number of subframes in A-MPDU. The aggregated packets can be particularly efficient for wireless channels although troubled by standard TCP protocol enforcement.

Advantageously, network performance is improved with higher throughput of TCP traffic.

BRIEF DESCRIPTION OF THE FIGURES

In the following figures, like reference numbers are used to refer to like elements. Although the following figures depict various examples of the invention, the invention is not limited to the examples depicted in the figures.

DETAILED DESCRIPTION

The present invention provides methods, computer program products, and systems for increasing throughput density of TCP traffic on a hybrid network having both wired and wireless connections, by modifying TCP layer behavior over the wireless connection while maintaining TCP protocol. One of ordinary skill in the art will recognize that many other scenarios are possible, given the present disclosure, as discussed in more detail below. For example, an access point is the main implementation of a Wi-Fi edge device for the sake of brevity, but there are other possible devices (e.g., a router, a switch, a repeater device, a mesh web device, a Wi-Fi hot spot, or the like.

Figure 1:
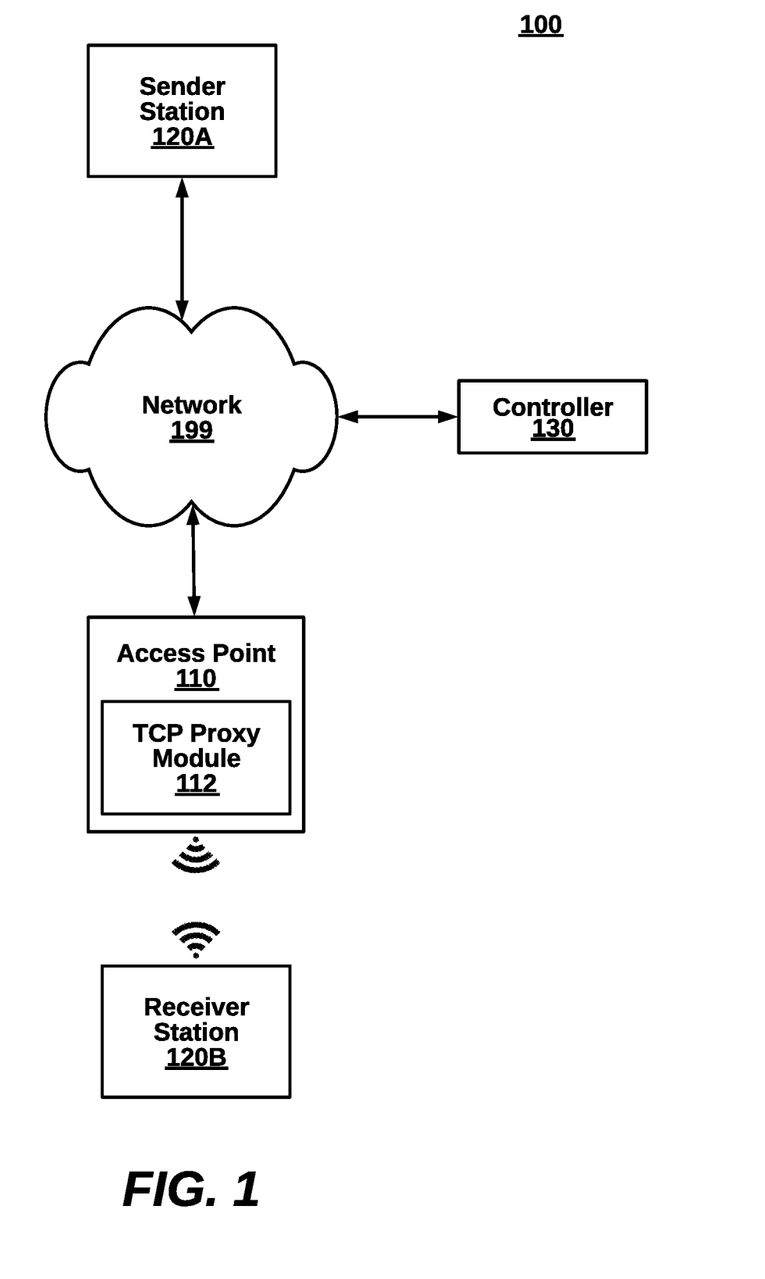
FIG. 1 is a high-level block diagram illustrating a system to increase throughput density of TCP traffic on a hybrid network having both wired and wireless connections, by modifying TCP layer behavior over the wireless connection while maintaining TCP protocol, according to one embodiment.
Figure 2:
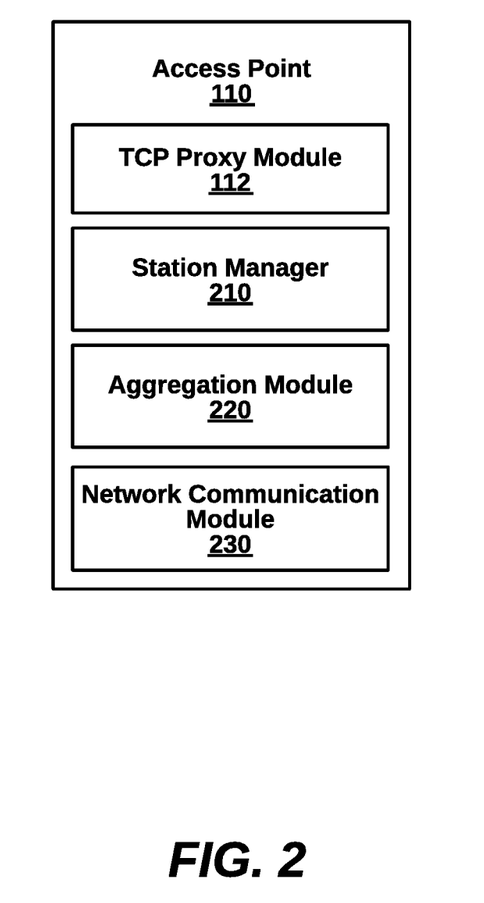
FIG. 2 is a more detailed block diagram illustrating internal components of a TCP proxy device from the system of FIG. 1, according to some embodiments.

Systems to Increase TCP Throughput Density on Hybrid Networks (FIGS. 1-2)

FIG. 1 is a high-level block diagram illustrating a system 100 to increase throughput density of TCP traffic on a hybrid network having both wired and wireless connections, by modifying TCP layer behavior over the wireless connection while maintaining TCP protocol, according to one embodiment. The system 100 comprises an access point 110, wireless stations 120A-B, and controller 130. Many other configurations are possible. For example, additional network components can also be part of the system 100, such as firewalls, virus scanners, routers, switches, application servers, databases, and the like. Each of the components in the system 100 are communicatively coupled through the network 199.

In an embodiment, network 199 comprises both a wired portion and a wireless portion of a data communication network. Network 199 can be the Internet, a WAN, a LAN, a Wi-Fi, a WLAN, or other type of data communication network providing a data channel for components of the system 100. Control of the network can be by a business organization, a government agency, or an individual household, without limitation to other possibilities. The components can use data channel protocols, such as IEEE 802.11a/b/g, IEEE 802.11n, 802.11ac, or other versions of the 802.11 and other wireless standards. Referring specifically to FIG. 1, the access point 110 is coupled across the network 199 preferably over wired connections. In turn, the stations 120A-B are coupled to the access point 110, preferably over wireless connections.

The access point 110 further comprises a TCP proxy module 112 to modify TCP behavior of the access point with respect to certain sessions of network packets. In operation, a WLAN driver of the TCP proxy module retransmits network packets received from a sender device over the data communication network to a wireless station.

TCP network packets are diverted to a TCP proxy pipeline. First, the wireless receiver device is emulated to a wireless sender device by providing an ACK packet to the sender device in order to close the TCP session on the sender side by responding to a TCP handshake with the sender device. Second, the sender device is emulated to a wireless station over the wireless network connection by initiating a TCP handshake with a wireless station including receiving an ACK packet from the wireless station and suppressing the ACK packet from an initial destination associated with the sender device. In other words, the TCP proxy pipeline makes a TCP server unaware, and bifurcated from, congestion on the wireless portion of a network. As a consequence of this congestion, round trip times for TCP ACK frames degrade TCP mechanisms and, in turn, overall network performance.

In one embodiment, the access point 110 off-loads TCP emulations to the controller 130. From the perspective of the controller 130, performing TCP emulations for multiple access points allows uniform implementation of network policies with standardized decision logic. In addition to the access point 110, there can be several other access points under management of the controller 130. By having contact with multiple access points, the controller 130 is able to track a specific user or a specific device as it moves around different rooms in a building services by different access points. The controller 130 can ensure consistent TCP proxy behavior throughout the changes in location. Some embodiments of the system 100 do not include the controller 130 to manage one or more access points.

Figure 5:
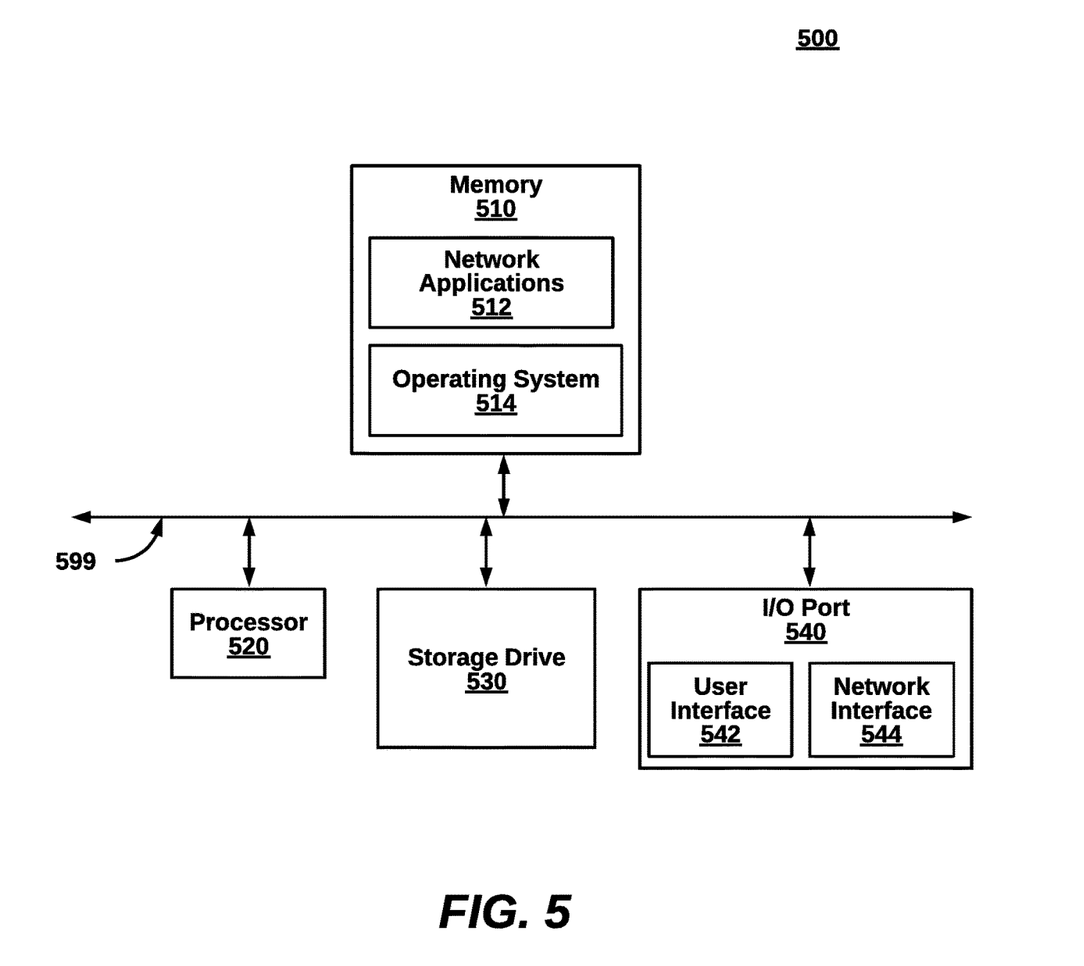
FIG. 5 is a block diagram illustrating an example computing device, according to one embodiment.

The access point 110 physically includes one or more individual access points implemented in any of the computing devices discussed herein (e.g., see FIG. 5). For example, the access point 110 can be an AP 110 or AP 433 (modified as discussed herein) by Fortinet, Inc. of Sunnyvale, Calif. A network administrator can strategically place the access point 120 for optimal coverage area over a locale. The access point 120 can, in turn, be connected to a wired hub, switch or router connected to the enterprise network 199 (or an external network). In embodiment, access point functionality is incorporated into a switch or router. In another embodiment, the access point 110 is a virtual device in whole or in part. Further embodiments of the access point 110 are discussed with respect to FIG. 2.

Additionally, the stations 120A-B of the system 100 can be implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 5).

Generally, the network components of the system 100 can be implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 5). No client configuration or download is needed for this particular technique, although a client app can be downloaded for optimizations.

FIG. 2 is a more detailed block diagram illustrating internal components of the TCP proxy device 110 from the system of FIG. 1 implemented as part of an access point 200, according to some embodiments. The access point 100 comprises a TCP proxy module 112, a station manager 210, an aggregation module 220, and network communication module 230.

The TCP proxy module 112 can be implemented, in part, by a specialized ASIC or other computer hardware that is optimized for airtime fairness determinations. In an embodiment, an operating system of the access point 110 is updated with a patch to implement RTS error determination. In another embodiment, a separate TCP proxy server (not pictured) is in communication with the access point 110.

The station manager 210 can oversee connections to different wireless stations and manage associated BSSIDs (basic service set identifiers). The station manager 210 can also store connection histories for stations for optimized settings upon reconnection to the same device or the same user.

The aggregation module 220 can store data packets in a buffer or queue while being processed and until ready for transmission. One implementation buffers a maximum number of subframes in A-MPDU (MAC protocol data unit) for high throughput transmissions. Overhead is reduced with A-MPDU aggregation by eliminating waiting periods between multiple frames. In aggregating, each Ethernet frame destined for a wireless channel can be wrapped with a IEEE 802.11n MAC header.

The network communication module 230 includes APIs, networking software and hardware ports and protocols, and radios needed to communicate with access points, stations, external databases and severs, and the like. The network communication module 230 can include the MAC layer and the PHY layer from the OSI network protocol stack. Data and ACK frames are sent on the physical channel.

II. Methods for Increasing TCP Throughput Density on Hybrid Networks (FIGS. 3-4)

Figure 3:
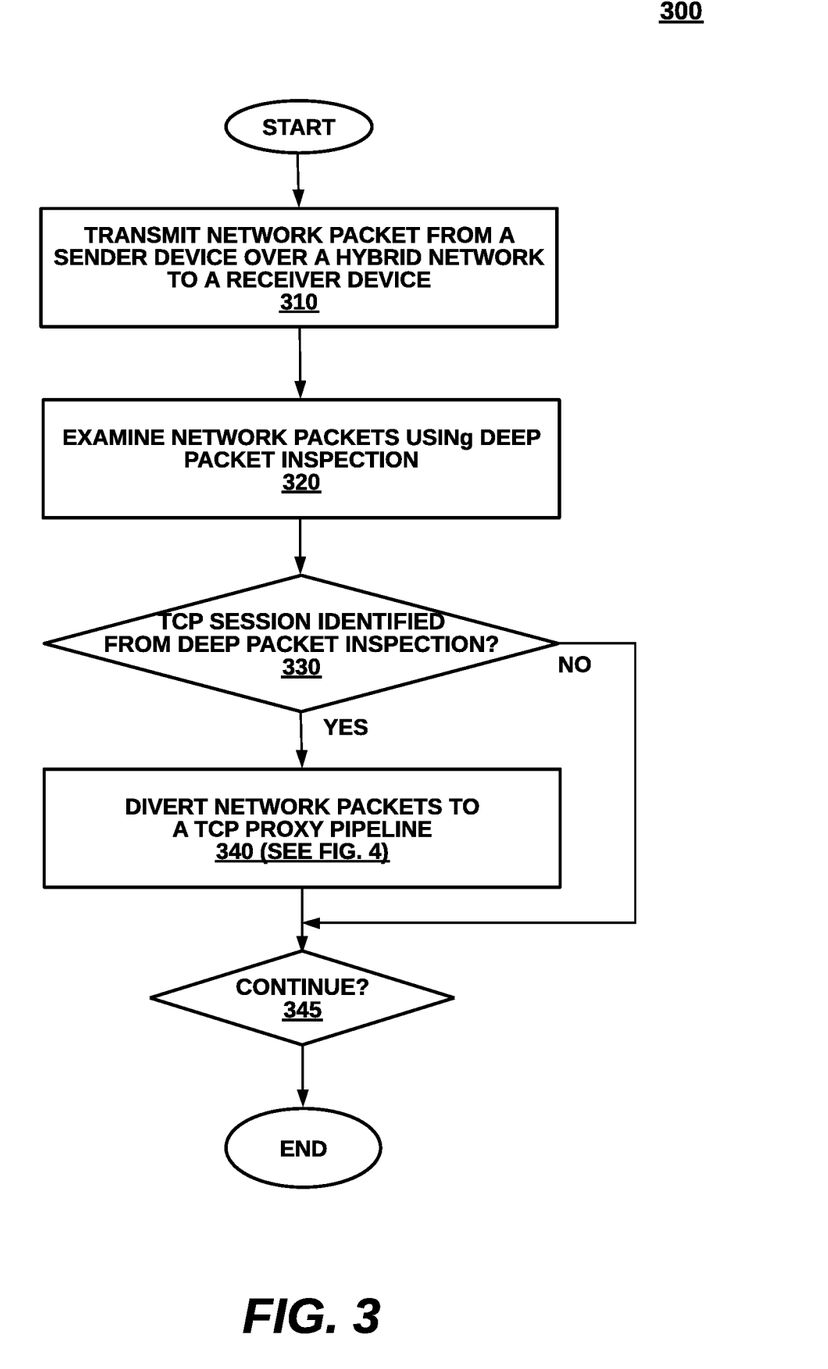
FIG. 3 is a high-level flow diagram illustrating a method for increasing throughput density of TCP traffic on a hybrid network having both wired and wireless connections, by modifying TCP layer behavior over the wireless connection while maintaining TCP protocol, according to one embodiment.
Figure 4:
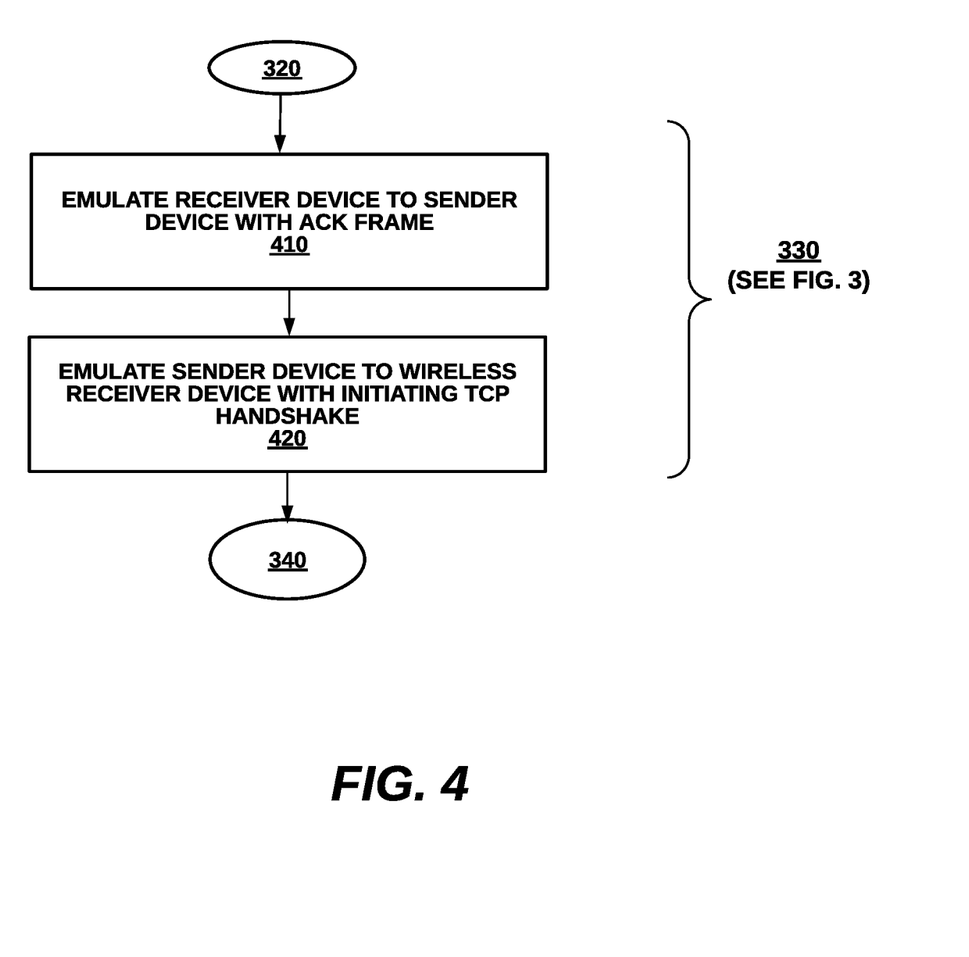
FIG. 4 is a more detailed flow diagram illustrating a step of aggregating Wi-Fi network packets, from the method of FIG. 3, according to one embodiment.

FIG. 3 is a high-level flow diagram illustrating a method 300 for increasing throughput density of TCP traffic on a hybrid network having both wired and wireless connections, by modifying TCP layer behavior over the wireless connection while maintaining TCP protocol, according to one embodiment. The method 300 can be implemented by the system 100 of FIG. 1 or a different system. One of ordinary skill in the art will recognize that the method 300 is non-limiting as other embodiments can have more or less steps and can be performed in a different order.

At step 310 network packets transmitted from a sender device over the data communication network to a wireless station are received at a WLAN driver of the TCP proxy device.

At step 320 network packets are examined using DPI, in an embodiment. Network packet analysis is not limited to DPI, in other embodiments. A processor and memory can be accessed for analyzing packets. In one instance, a fingerprint for network packets is generated and compared against stored fingerprints of known TCP services.

At step 330, a TCP session is detected from the DPI. In an embodiment, non-TCP sessions bypass the TCP proxy pipeline. For example, UDP packets are not affected by the TCP proxy pipeline and need not inherit the associated overhead from the technique.

At step 340, responsive to detecting the TCP session, the network packets are diverted to a TCP proxy pipeline, as set forth below with respect to FIG. 4. Advantageously, negative affects of TCP of throughput at Wi-Fi edges are reduced.

At step 350, the WLAN driver transmits the network packets for transmission to the wireless station over the wireless network of the data communication network, including aggregated packets.

At step 355, the process continues until ended.

FIG. 4 is a more detailed flow diagram illustrating a step 320 of aggregating Wi-Fi network packets, from the method of FIG. 3, according to one embodiment.

At step 410, a wireless receiver device is emulated to a sender device. To this end, an ACK packet is sent back to a sender device in order to close the TCP session on a sender side by responding to a TCP handshake with a sender device.

At step 420, a sender device is emulated to a wireless station over the wireless network connection by initiating a TCP handshake with a wireless station. Additionally, an ACK packet from the wireless station is suppressed by not forwarding to the sender device. The TCP proxy device has already sent an ACK to the sender device in step 410.

III. Generic Computing Device (FIG. 5)

FIG. 5 is a block diagram illustrating an exemplary computing device 500 for use in the system 100 of FIG. 1, according to one embodiment. The computing device 500 is an exemplary device that is implementable for each of the components of the system 100, including the access point 110 and the wireless stations 120A-B. The computing device 500 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 500, of the present embodiment, includes a memory 510, a processor 520, a storage drive 530, and an I/O port 540. Each of the components is coupled for electronic communication via a bus 599. Communication can be digital and/or analog, and use any suitable protocol.

The memory 510 further comprises network applications 512 and an operating system 514. The network applications 512 can include the modules of the access point 110 and the wireless stations 120A-B, as illustrated in FIGS. 1-2. Other network applications 512 can include a web browser, a mobile application, an application that uses networking, a remote application executing locally, a network protocol application, a network management application, a network routing application, or the like.

The operating system 514 can be one of the Microsoft Windows® family of operating systems (e.g., Windows 95, 98, Me, Windows NT, Windows 2000, Windows XP, Windows XP x74 Edition, Windows Vista, Windows CE, Windows Mobile, Windows 10, Windows 7 or Windows 8), Linux, HP-UX, UNIX, Sun OS, Solaris, Mac OS X, Alpha OS, AIX, IRIX32, or IRIX74. Other operating systems may be used. Microsoft Windows is a trademark of Microsoft Corporation.

The processor 520 can be a network processor (e.g., optimized for IEEE 802.11), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 520 can be single core, multiple core, or include more than one processing elements. The processor 520 can be disposed on silicon or any other suitable material. The processor 520 can receive and execute instructions and data stored in the memory 510 or the storage drive 530.

The storage drive 530 can be any non-volatile type of storage such as a magnetic disc, EEPROM (electronically erasable programmable read-only memory), Flash, or the like. The storage drive 530 stores code and data for applications.

The I/O port 540 further comprises a user interface 542 and a network interface 544. The user interface 542 can output to a display device and receive input from, for example, a keyboard. The network interface 544 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C #, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A method in an access point, on a data communication network, for increasing throughput density of TCP traffic on a hybrid network having both wired and wireless connections, by modifying TCP layer behavior over the wireless connection while maintaining TCP protocol, the method comprising the steps of:
   receiving, at a WLAN driver of the access point, network packets transmitted from a sender device over the data communication network to a wireless station;
   examining, with a processor of the access point, network traffic using DPI (deep packet inspection);
   detecting a TCP session from the DPI to examine each network packet;
   responsive to detecting the TCP session, diverting network packets to a TCP proxy pipeline, comprising:
      emulating a wireless receiver device by providing an ACK packet to a sender device in order to close a TCP session on the sender device by responding to a TCP handshake with the sender device;
      emulating the sender device to a wireless station over wireless network connection by initiating a TCP handshake with a wireless station including receiving an ACK packet from the wireless station and suppressing the ACK packet from an initial destination associated with the sender device; after receiver device emulation, aggregating multiple network packets at the WLAN driver into an A-MPDU (MAC protocol data unit) network packet; and
   transmitting, from the WLAN driver, the network packets for transmission to the wireless station over the wireless network of the data communication network.

2. The method of claim 1, further comprising:
   detecting a non-TCP session using DPI to examine each network packet; and
   responsive to detecting the non-TCP session, transmitting, from the WLAN driver, the network packets directly to the WLAN driver for transmission to the wireless station, while allowing TCP to operate in a conventional manner without diverting the network packets to a TCP proxy pipeline.

3. A non-transitory computer-readable medium to, when executed by a processor, perform a computer-implemented method in an access point for increasing throughput density of TCP traffic on a hybrid network having both wired and wireless connections, by modifying TCP layer behavior over the wireless connection while maintaining TCP protocol, the method comprising:
   receiving, at a WLAN driver of the access point, network packets transmitted from a sender device over the data communication network to a wireless station;
   examining, with a processor of the TCP access point, network traffic using DPI(deep packet inspection);
   detecting a TCP session from the DPI to examine each network packet;
   responsive to detecting the TCP session, diverting network packets to a TCP proxy pipeline, comprising:
      emulating a wireless receiver device by providing an ACK packet to a sender device in order to close a TCP session on the sender device by responding to a TCP handshake with the sender device; and
      emulating the sender device to a wireless station over wireless network connection by initiating a TCP handshake with a wireless station including receiving an ACK packet from the wireless station and suppressing the ACK packet from an initial destination associated with the sender device;
      emulating the sender device to a wireless station over wireless network connection by initiating a TCP handshake with a wireless station including receiving an ACK packet from the wireless station and suppressing the ACK packet from an initial destination associated with the sender device; after receiver device emulation, aggregating multiple network packets at the WLAN driver into an A-MPDU (MAC protocol data unit) network packet; and
   transmitting, from the WLAN driver, the network packets for transmission to the wireless station over the wireless network of the data communication network.

4. An access point, on a data communication network, for increasing throughput density of TCP traffic on a hybrid network having both wired and wireless connections, by modifying TCP layer behavior over the wireless connection while maintaining TCP protocol, the access point comprising:
   a processor;
   a network interface, communicatively coupled to the processor and the data communication network; and
   a memory, storing:
      a WLAN driver to receive network packets transmitted from a sender device over the data communication network to a wireless station,
      wherein the processor to examine network traffic using DPI (deep packet inspection), to detect a TCP session from the DPI to examine each network packet, and responsive to detecting the TCP session, to divert network packets to a TCP proxy pipeline, comprising:
         emulating a wireless receiver device by providing an ACK packet to a sender device in order to close a TCP session on the sender device by responding to a TCP handshake with the sender device;
         emulating the sender device to a wireless station over wireless network connection by initiating a TCP handshake with a wireless station including receiving an ACK packet from the wireless station and suppressing the ACK packet from an initial destination associated with the sender device; after receiver device emulation, aggregating multiple network packets at the WLAN driver into an A-MPDU (MAC protocol data unit) network packet; and transmitting, from the WLAN driver, the network packets for transmission to the wireless station over the wireless network of the data communication network.

\* \* \* \* \*